May 17, 1938.  F. L. ROHRBACH  2,117,361
OIL FILTER WITH RENEWABLE FILTERING ELEMENT
Filed Aug. 10, 1933   2 Sheets-Sheet 1
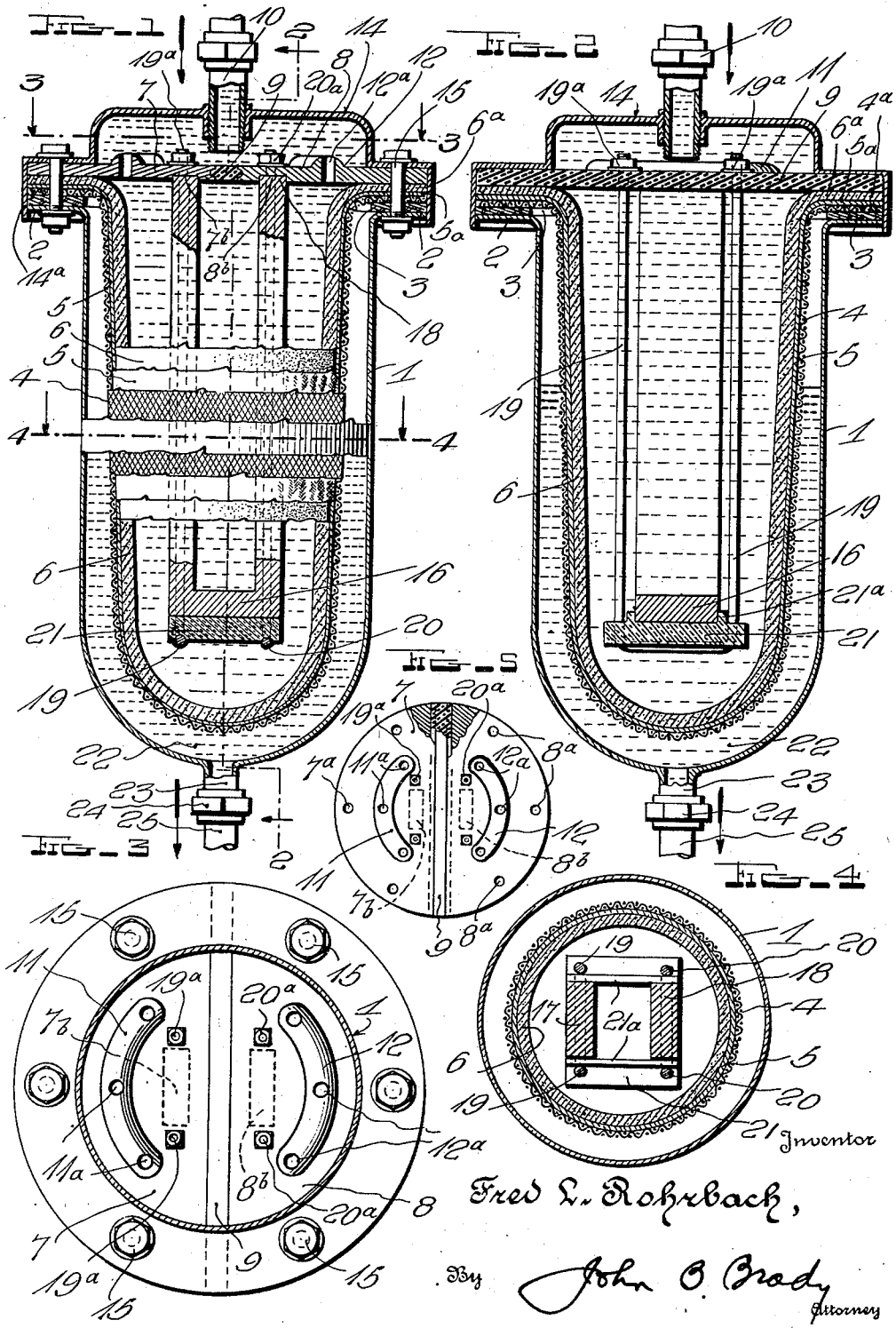

May 17, 1938. F. L. ROHRBACH 2,117,361
OIL FILTER WITH RENEWABLE FILTERING ELEMENT
Filed Aug. 10, 1933 2 Sheets-Sheet 2
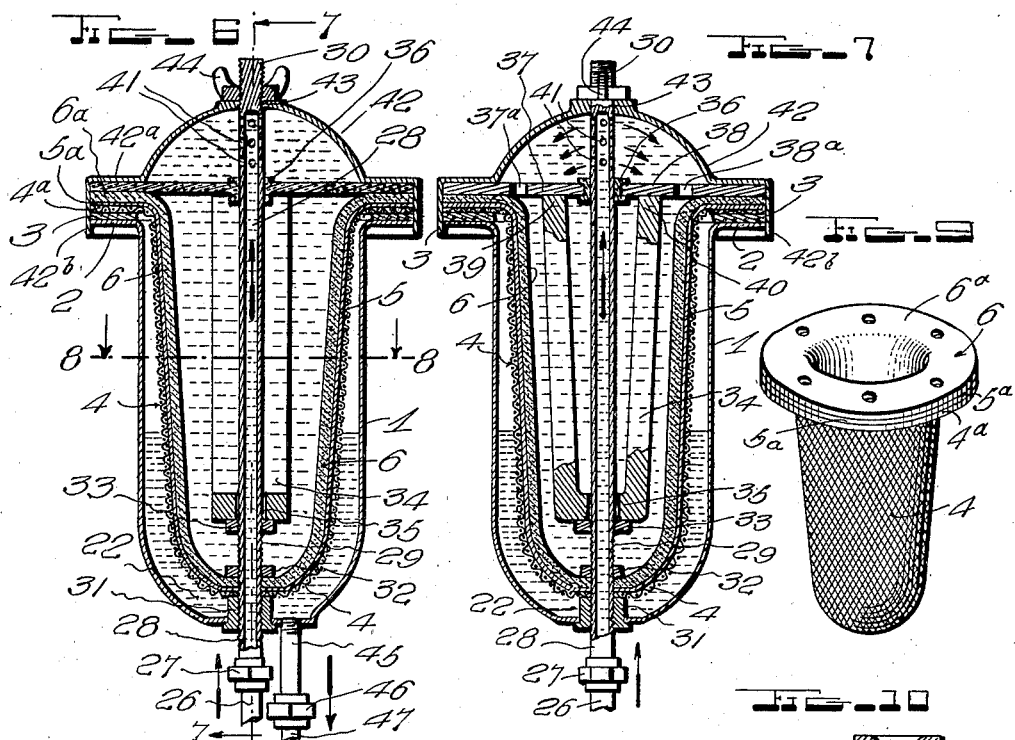
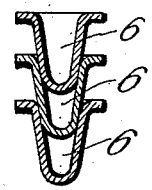
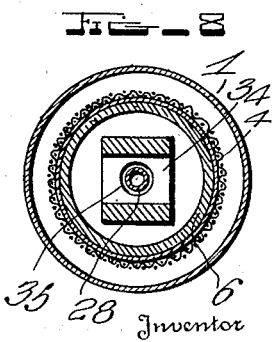
Fred L. Rohrbach,
By John O. Grady
Attorney Patented May 17, 1938

2,117,361

UNITED STATES PATENT OFFICE 2,117,361

OIL FILTER WITH RENEWABLE FILTERING ELEMENT

Fred L. Rohrbach, Washington, D. C., assignor of one-half to Frank B. Netherland, Kenwood, Md.

Application August 10, 1933, Serial No. 684,575

6 Claims. (Cl. 210—164)

My invention relates broadly to oil filters for hydrocarbon engines and more particularly to the construction of a simplified oil filter having a renewable filter element therein.

One of the objects of my invention is to provide a construction of oil filter which includes a renewable filter element formed of a cellulose product which may be inexpensively manufactured and renewed from time to time at small cost for maintaining the oil which circulates through the hydrocarbon engine in good condition for obtaining maximum lubricating effect therefrom.

Another object of my invention is to provide a construction of oil filter consisting of a relatively small number of parts and including a renewable filter element which may be changed at frequent intervals at such times as when the oil may be changed in the crank case of an automobile engine.

Still another object of my invention is to provide an oil filter constructed to receive a substantially cup shaped renewable filter element pressed from a cellulose product shaped to form a filter liner and capable of being telescopically stacked for purposes of shipment and convenient use in renewing the filter element in the oil supply of hydrocarbon engines from time to time.

A further object of my invention is to provide an improved construction of oil filter for hydrocarbon engines in which the filter includes a cylindrical casing with a screen-like receptacle therein adapted to form a mounting for a renewable paper filter element having a cloth-like covering formed over the exterior surface thereof and through which oil laden with dirt and foreign particles is forced for effecting a filtering operation and freeing the oil of such undesired dirt and foreign particles.

A still further object of my invention is to provide a construction of oil filter for hydrocarbon engines which employs a preformed paper filter element adapted to be inserted into or removed from the filter casing for insuring good lubricating properties for the oil and correspondingly maintaining high operating efficiency for the engine.

Another object of my invention is to provide a construction of oil filter including a renewable filter element and magnetic means for extracting from the oil in the course of the passage thereof through the filter all fine particles of iron and steel which are carried by the lubricant to the great detriment of the engine bearings.

Still another object of my invention is to provide a construction of magnetized screening element for an oil filter by which iron and steel particles or chips which may be carried along during the circulation of the oil, are extracted from the oil prior to the filtering of the oil through a renewable filter element for insuring the removal of fine iron or steel particles and insuring the removal of dirt and other foreign matter from the oil.

A further object of my invention is to provide a construction of magnetic screening devices for an oil filter wherein parts of the magnetic screening device are formed into pole pieces over which the oil passes while the magnetic particles are extracted therefrom by adherence to the magnetic pole pieces of the filter.

Other and further objects of my invention reside in the construction of a simplified oil filter for hydrocarbon engines as set forth more fully in the specification hereinafter following by reference to the accompanying drawings, in which:

Figure 1 is a central vertical longitudinal sectional view of an oil filter constructed in accordance with my invention; Fig. 2 is a transverse vertical sectional view taken on line 2—2 of Fig. 1; Fig. 3 is a horizontal sectional view taken on line 3—3 of Fig. 1; Fig. 4 is a similar view taken on line 4—4 of Fig. 1; Fig. 5 is a detailed plan view with parts broken away and in section, looking at the discs carried by the upper ends of the legs of the magnet; Fig. 6 is a central vertical longitudinal sectional view showing a modified form of my invention; Fig. 7 is a transverse vertical sectional view taken on line 7—7 of Fig. 6; Fig. 8 is a horizontal sectional view taken on line 8—8 of Fig. 6; Fig. 9 is a perspective view of one of the removable oil filters, common to all forms; and Fig. 10 is a sectional view showing a plurality of oil filters showing the manner of telescopically nesting the same when shipping or storing to conserve space while preventing possible injury to the filters.

My invention is directed to the construction of a simplified form of oil filter for automobiles wherein a preformed element manufactured of a cellulose product may be inserted into or removed from the filter casing at frequent intervals at such time as an oil station attendant may change the oil in the crank case of the automobile. I construct the cellulose filter element from such inexpensive material that a filter element which contains an accumulation of dirt and foreign matter may be very readily disposed of and a fresh filter element inserted in the oil filter. The preformed renewable filter element employed in the oil filter of my invention is pressed to shape from a cellulose product which has a texture somewhat in the nature of blotting paper and which is sufficiently porous to allow the clear oil to effectively pass therethrough while dirt and foreign matter is blocked by the filter element and retained on the interior surface thereof. When the filter element has accumulated a sufficient amount of dirt or foreign matter from the oil, the filter element is removed and disposed of and a fresh preformed paper filter element substituted in the filter casing.

By reason of the construction of the filter element from a cellulose product it is important to avoid all abrasion of the surface of the filter element. I therefore provide for protection of the outside of the renewable paper filter element by means of a screen-like basket. I also prevent the injurious effects which might arise by the abrasion of fine metallic particles against the interior wall of the filter element and eliminate injury to bearings which may result from such particles by arranging a magnetic device in the path of the circulating oil for extracting from the oil iron and steel particles. In one form of my invention, I provide a permanent magnet terminating in pole pieces which are perforated to serve as strainer elements through which the oil must pass. In the course of circulation of the oil through the material of the stainer elements, the magnetic particles adhere to the strainer elements and are prevented from passing through the chamber which includes the renewable paper filter element. In another form of my invention, I provide an electromagnetic device which is mounted exteriorly of the casing of the filter but has pole pieces projecting interiorly of the casing to a position adjacent the magnetized strainer head for the filter. The magnetized strainer head is perforated for the passage of oil but is shaped to retain magnetic particles which tend to adhere thereto under the action of the electromagnetic device, thereby freeing the circulating oil from fine metallic particles. The casing of the oil filter is manufactured in such form that an oil inlet and outlet connection may be conveniently made thereto for connection in series with the crank case of the engine. In one form of my invention, I construct the filter casing with an oil inlet at the top thereof and an oil outlet at the base thereof. In another form of my invention, I provide an oil inlet and discharge connection at the same end of the casing of the oil filter, thereby simplifying the manner of removably mounting the top of the oil filter casing with respect to the filter chamber of the oil filter casing.

Referring to the drawings in detail, reference character 1 designates a cylindrical casing of the oil filter of my invention. The cylindrical casing 1 has an annular flange 2 at the upper extremity thereof which provides a seat for the annular gasket 3. A removable wire screen basket 4 is supported in concentric relation to the cylindrical casing 1 and has a flange thereon which is adapted to be seated upon the annular gasket 3. The wire screen forming the basket 4 serves as a support for parts of the filter and is not intended as a filter or straining element in itself. I provide a cloth lining 5 for the supporting basket 4 in the form of a pocket which is shaped to the contour of the wire basket 4. The cloth lining 5 closely adheres to the interior of the screen-like basket 4 and serves as a support for the preformed renewable filter element 6. The preformed filter element 6 is pressed from a cellulose product such as paper and has a porosity comparable with the porosity of blotting paper. The renewable filter element 6 is shaped to telescopically enter the cloth lining 5 and contact throughout the area thereof. The renewable filter element 6 is shaped to provide an annular flange portion 6a thereon which directly conforms with the flange portion 5a of the cloth lining and the flange portion 4a of the wire basket. The several flanges are superimposed with respect to each other as shown. I provide a pair of electromagnetic strainer plate members 7 and 8 separated diametrically by an insulated strip member 9 as shown. There is a tongue and groove connection between the insulated strip member 9 and the strainer plate members 7 and 8 for thereby forming a rigid circular plate which extends across the top of the cylindrical chamber 1 and rests upon the top of the flange 6a of the renewable filter element 6. Each of the strainer plate members 7 and 8 is provided with arcuate raised portions 11 and 12, each of which contains perforations 11a and 12a therein. The perforations 11a and 12a provide passages for oil which enters the top of the oil filter through pipe 10 connected to the cover plate 14. The cover plate 14 is formed from non-magnetic material and is clamped in position with respect to the electromagnetic strainer plate members 7 and 8 by means of bolt members 15. The bolt members 15 extend through apertures 7a and 8a and through the flange-like portions 6a of the renewable filter element 6 and the flange-like portion 5a of the cloth-like lining 5 and through the flange-like portion 4a of the screen-like basket 4. The top 14 has a downwardly extending skirt 14a which encases the peripheries of the strainer plate members 7 and 8 and the superimposed flanges 6a, 5a and 4a, and forms a tight joint with respect to the peripheral edge of the annular flange 2. The joint is sealed by means of gasket 3 which is tightly clamped by bolt members 15 in the arrangement heretofore explained.

The strainer plate members 7 and 8 form continuations of the electromagnetic pole pieces of the horseshoe magnet represented at 16. The horseshoe magnet 16 has pole tip 17 thereof secured in magnetic connection with strainer plate 7 and pole piece 18 secured in magnetic connection with strainer plate 8 in pockets 7b and 8b respectively. The horseshoe magnet 16 is secured in position by means of wire yoke members shown at 19 and 20 which pass through the respective strainer plates 7 and 8 and are secured therethrough by nuts 19a and 20a. The wire yoke members 19 and 20 are prevented from contacting with the horseshoe magnet 16 by means of insulator 21 around which the wire yoke members 19 and 20 pass. The insulator 21 is provided with suitable spacing flanges 21a for securing the magnet in position with the wire yoke members in spaced relation with respect thereto. By this arrangement there is always an open magnetic circuit which tends to attract particles of iron and steel which are carried into the oil filter through the pipe 10. The fine particles magnetically adhere to the magnetized plates 7 and 8 adjacent the apertures 11a and 12a therein, thus allowing the passage of the oil while preventing the passage of the iron and steel particles.

The oil which passes through the perforations 11a and 12a free of the iron and steel particles, seeps into the filter element 6. Sediment from the oil is prevented from passing from the filter element 6 through the cloth-like lining 5 and through the screen-like basket 4 so that only clear oil accumulates in the lower portion of the casing 1 in the bowl portion 22 of the casing 1 and in the annular space between the screen-like basket 4 and the interior wall of the cylindrical casing 1. The discharge pipe for the filter is shown at 23 which is connected through a suitable coupling 24 to the pipe 25 which returns the clear oil to the crank case of the engine.

It will be observed that in the structure of oil filter shown in Figs. 1–5 the used lubricant is introduced adjacent the top of the filter while the clear oil is withdrawn adjacent the bottom of the filter. There are many instances where it is desirable to avoid the installation of the oil supply pipe in a position over the oil filter chamber. To meet such conditions I may arrange the filter inlet and discharge connections as illustrated in Figs. 6 and 7 wherein the discharge pipe from the crank case is indicated at 26 connected through coupling 27 with the pipe 28 which extends vertically through the filter casing 1 as shown. The pipe 28 is screw threaded at 29 throughout the lower portion of its length and screw threaded at 30 throughout the upper portion of its length. The threaded portion 29 of pipe 28 is engaged by the internally screw threaded bushing 31 which is carried in the end of the bowl portion 22 of the filter casing. Bushing 31 projects upwardly to provide a seat for the lower end of the wire basket 4 as shown. The pipe 28 extends through aligned apertures in the bottom of the wire basket 4, the cloth-like lining 5, and the renewable filter element 6 and is secured with respect thereto by means of nut 32 engaging the screw threads 29 on the pipe 28 and engaging the interior bottom surface of the renewable lining 6. The adjustable nut 33 also engages the screw threads 29 on pipe 28 and provides a lower support for the horseshoe magnet 34. The horseshoe magnet 34 is apertured at 35 to enable a non-magnetic pipe 28 such as a pipe formed from brass or copper to pass therethrough. The pipe 28 passes through an aperture in the diametrically extending strip 36 and forms a separator for the semi-circular disc-like strainer plates 37 and 38. The disc-like strainer plates 37 and 38 form extended pole pieces for the poles 39 and 40 of the horseshoe magnet 34 which is clamped with respect to the strainer plate members 37 and 38 by means of nut 33. The strainer plate members 37 and 38 are apertured at 37a and 38a for the passage of oil into the interior of the renewable paper filter element 6 free of magnetic particles which are caught by the magnetized strainer plates 37 and 38. The upper extremity of the pipe 28 is perforated as represented at 41 allowing the used oil which is supplied through the interior of pipe 28 to be distributed over the strainer plates 37 and 38 and magnetic particles caught therein by the strainer plates while the oil seeps through perforations 37a and 38a. A cover member 42 extends over the end of the oil filter casing and is apertured at 43 to pass over the upper extremity of the screw threaded portion 30 of the pipe 28. A wing nut 44 engages the screw threaded portion 30 of the pipe 28 for securing cover member 42 in position on the oil filter. The cover member 42 has an annular flange portion 42a which engages the peripheral portions of the disc-like strainer plates 37 and 38 and the annular flange 6a of the renewable filter element, the flange 5a of the cloth lining 5 and the flange 4a of the wire screen-like basket 4 superimposed upon the gasket 3 supported on the annular flange 2 of the casing 1. The depending skirt 42b of the non-magnetic cover member 42 serves to confine all of the several flanges, strainer plates and gasket in position and to provide a tight closure with respect to the flange 2 of casing 1. In this construction of oil filter the oil is discharged through a pipe 45 screw threaded to the bowl portion 22 of the casing 1 as shown and connected through a coupling 46 with the pipe 47 which returns the oil to the bearings.

The removable filter elements 6 which are inserted by the oil station attendant in the oil filter are preferably disposed in stacked relation for convenience in shipment, storage and use from time to time as illustrated in Fig. 10. The slight taper possessed by each of the renewable filter elements 6 facilitates the telescopic stacking of the renewable filter elements as shown.

While I have described the oil filter of my invention particularly in connection with hydrocarbon engines, the filter and the renewable filtering element therein is especially suited for installation in domestic oil burner systems wherein more efficient operation of the burner is obtained by use of the oil filter. In cases where the filter of my invention is employed, clinkering in the oil pot in the furnace is avoided. It is a simple matter to renew the filter element from time to time, thereby insuring the feeding of clean fuel oil to the burner.

I have found the oil filter of my invention highly practical in its construction and successful in its operation. I have illustrated my invention in certain preferred embodiments but I am fully aware that modifications may be made in the constructions illustrated and I intend all of such modifications as will readily suggest themselves to those skilled in the art to be included as part of my invention and I intend no limitations upon my invention other than may be imposed by the scope of the appended claims.

What I claim as new and desire to secure by Letters Patent of the United States is as follows:

1. An oil filter comprising a tank, a removable closure for said tank, a renewable filter element preformed from a cellulose product to substantially conform with the shape of said tank, insertable into and removable from said tank, oil inlet and discharge connections, means for suspending said renewable filter element in a position between said oil inlet and discharge connections, a strainer plate disposed in the path between said oil inlet connection and said renewable filter element, and a horseshoe magnet having its pole pieces contacting with parts of said strainer plate and downwardly depending to a position within said renewable filter element for permanently magnetizing the parts of said strainer plate whereby magnetic particles are collected in the course of the passage of the oil from said oil inlet connection to said renewable filter element.

2. An oil filter comprising a tank, oil inlet and discharge connections for said tank, a preformed cellulose filter element suspended in said tank intermediate said oil inlet and discharge connections, a strainer device disposed normal to the axis of said filter element, said strainer device being divided into a pair of semicircular members, a diametrical strip of insulation material extending therebetween, and means for magnetizing each of said members for collecting particles of iron and steel carried by oil in the course of the passage thereof through said strainer device.

3. An oil filter comprising a tank, oil inlet and discharge connections for said tank, a preformed cellulose filter element suspended in said tank intermediate said oil inlet and discharge connections, a strainer device disposed normal to the axis of said filter element, said strainer device being divided into a pair of semicircular members, a diametrical strip of insulation material extending therebetween and a permanent magnet having the respective poles thereof disposed in contact with the individual semicircular members for magnetically collecting particles of iron and steel carried by the oil in the course of the passage thereof through said strainer device.

4. An oil filter comprising a tank, oil inlet and discharge connections for said tank, a preformed cellulose filter element suspended in said tank intermediate said oil inlet and discharge connections, a strainer device disposed normal to the axis of said filter element, said strainer device being divided into a pair of semicircular members, a diametrical strip of insulation material extending therebetween and a permanent horseshoe magnet depending downwardly within said filter element with one pole thereof connected to one semicircular member and the other pole thereof connected with the other semicircular member whereby said members form extensions of the magnetic poles of said magnet, each of said members being perforated for the passage of oil while preventing the passage of particles of iron and steel carried by the oil in the course of the circulation thereof through said strainer device.

5. An oil filter comprising a tank, oil inlet and discharge connections for said tank, a renewable cellulose filter element suspended in said tank in the path of oil circulating between said oil inlet and discharge connections, a magnetic strainer plate extending across the top of said filter element, surface projections thereon, said strainer plate being perforated through the surface projections thereon for the passage of oil therethrough, and means for magnetizing said magnetic strainer plate for collecting particles of iron and steel from the circulating oil.

6. In an oil filter tank, oil inlet and discharge connections for said tank, a renewable filter element insertable into and removable from said tank, a removable strainer plate extending across said filter element and said tank, a permanent magnet, and a pair of yoke members extending through said strainer plate for mounting said permanent magnet in position centrally within said renewable filter element.

FRED L. ROHRBACH.